United States Patent Office 3,425,923
Patented Feb. 4, 1969

3,425,923
GRAFT INTERPOLYMERS OF POLY(ALKYLENE MONOSULFIDES) AND VINYL COMPOUNDS
Arthur J. Yu, Levittown, Pa., assignor to Thiokol Chemical Corporation, Bristol, Pa., a corporation of Delaware
No Drawing. Filed July 26, 1966, Ser. No. 567,819
U.S. Cl. 204—159.15          26 Claims
Int. Cl. C08f 1/16

ABSTRACT OF THE DISCLOSURE

Novel graft interpolymers, which are the reaction products of a poly(alkylene monosulfide) and one or more vinyl monomers which are attached at intervals along the poly(alkylene monosulfide) backbone, being formed by a novel process wherein a poly(alkylene monosulfide) is reacted with at least one vinyl compound by means of ionizing radiation.

---

This invention relates to novel graft interpolymers wherein a poly(alkylene monosulfide) backbone has grafted thereto vinyl polymer segments and to the novel process for the preparation of these graft interpolymers. More particularly, it relates to graft polymers and the process of making the same wherein a poly(alkylene monosulfide) is reacted with at least one vinyl compound by means of ionizing radiation.

As used herein, the term "graft interpolymer" means a material having a polymeric, high molecular weight backbone to which polymer chains formed from a different monomer are attached at intervals along the backbone chain. The backbone may itself be a homopolymer or an interpolymer. An interpolymer is defined as a polymer formed from two or more monomers.

Sulfur containing polymers are known generally for their solvent resistance and, in the case of polymers containing the monosulfide linkage, exhibit desirable high temperature molding properties. By grafting vinyl polymer segments to a poly(alkylene monosulfide), the graft interpolymer thus formed retains the high temperature molding properties of the backbone, poly(alkylene monosulfide), but also assumes some of the advantageous properties of the branch polymer. Thus the novel polymers of the present invention find utility as molding plastics, sealants, coating materials, gaskets, etc. Moreover, because of the physical arrangemnet of the polymeric constitutents of a graft polymer, i.e. branch segments projecting outward from the backbone polymer, a material may be prepared having surface characteristics which differ from the internal characteristics of the polymer. Thus, the molded materials prepared from the novel polymers of the present invention may be "tailor made" to suit the application.

Attempts to prepare such poly(alkylene monosulfide)-vinyl polymer segment graft polymers have, however, to date, met in failure. For example, various chemical catalysts have been tried to no avail in attempts to form such graft interpolymers.

An object of the present invention, therefore, is to provide, as a composition of matter, a novel class of graft polymers comprising a poly(alkylene monosulfide) backbone having branched vinyl polymer segments. Another object is to provide a polymer system having a wide range of useful end products. Still another object is to provide a novel process for the preparation of this graft polymer system. Other objects will become apparent from the ensuing disclosure and the examples contained therein.

Formation of the novel graft polymers of this invention is effected by subjecting a poly(alkylene monosulfide) to ionizing radiation and then reacting the thus treated poly(alkylene monosulfide) with vinyl monomer compounds. It is believed that the ionizing radiation produces initiating free radical sites on the backbone and that graft polymerization is effected at such sites by subsequent propagation, termination and chain transfer reactions.

The poly(alkylene monosulfide) used as the base polymer in the process of this invention may be used as such in the form of a film, fiber, fabric, or molded articles. In these instances this invention will find use for modifying the surface properties of the preformed article. For example, the dye reception and wettability of the base poly(alkylene monosulfide) may be desirably affected by applying the process of this invention to a poly(alkylene monosulfide) article. The invention is also applicable to a poly(alkylene monosulfide) which has not been formed into an article. In this case, each poly(alkylene monosulfide) polymer chain or at least a substantial proportion of the polymer chains in a particular batch of polymer is exposed to the process of this invention. In this case such properties as the solubility, moldability and flexibility of the poly(alkylene monosulfide) may be improved by the process of this invention.

In subjecting the base polymer to ionizing radiation, the graft interpolymers of this invention may be produced either by (1) separately irradiating the poly(alkylene monosulfide) to generate trapped free radicals thereon and then subsequently intimately contacting therewith the vinyl monomer to be grafted thereon, or by (2) irradiating the poly(alkylene monosulfide) which is in contact with the vinyl monomer to be grafted thereon. The utilization of the second method generally produces a mixture of the original poly(alkylene monosulfide), a linear homopolymer of the added vinyl monomer, and the graft polymer, however. Such a mixture may be separated into its components by selective extraction.

The poly(alkylene monosulfide) backbone of the graft polymers of this invention may be prepared from alkylene episulfide polymers such as disclosed in copending applications Ser. No. 165,034 filed Jan. 8, 1962; 267,-799 filed Mar. 25, 1963; 350,584 filed Mar. 9, 1964; 368,382 filed May 18, 1964; 404,946 filed Oct. 1, 1964; and 511,341 filed Dec. 3, 1965; all filed in the names of R. H. Gobran and S. W. Osborn; and copending application Ser. No. 363,996 filed Apr. 30, 1964 in the name of A. J. Yu.

"Alkylene episulfide" is used to mean any cyclic monosulfide containing two or more carbon atoms in the ring structure, i.e.

wherein R is an alkylene group, substituted or unsubstituted, containing two or more carbon atoms.

Also useful in this invention are the poly(fluorothiiranes) such as disclosed in U.S. Patent No. 3,136,744, and the episulfide polymers such as disclosed in U.S. Patent No. 3,222,326. Exemplary of the alkylene sulfides which may be utilized to form the poly(alkylene monosulfide) backbone of this invention are the thiiranes of vicinal episulfides such as ethylene sulfide propylene sulfide 1,2-butylene sulfide; 2,3-butylene sulfide; isobutylene sulfide; cyclohexene sulfides; styrene sulfide; vinyl cyclohexane sulfide; cyclohexenyl thiirane; paramethylstyrene sulfides; butadiene sulfides; 2-benzyl thiirane, allylthiirane, 1,2-epoxy-3,4-epithiobutane; allylthioglycidyl ether; thioglycidyl acrylate; thioglycidyl alkacrylate; tetrafluorothiirane; and other thiiranes disclosed in Chemical Reviews, vol. 66, No. 3, June 1966, pp. 297–340; and the higher alkylene sulfides, such as the thietanes, disclosed in Chemical Reviews, vol. 66, No. 3, June 1966, pp. 341–353; pentamethylene sulfide; and hexamethylene sulfide.

The poly(alkylene monosulfide) backbone may also be prepared from linear sulfur containing materials such as mercapto alkanols. Both homopolymers and interpolymers of these mercapto alkanols may be formed by heating the corresponding monomers in the presence of an acid such as dilute hydrochloric acid, sulfuric and phosphoric acids such as disclosed in copending application Ser. No. 242,609 filed Dec. 6, 1962 in the names of M. B. Berenbaum et al.

Poly(methylene monosulfide) such as disclosed in U.S. 3,070,580 containing the recurring $-(CH_2-S)-$ group is also acceptable for use as the backbone materials of the graft polymers of the invention.

The vinyl compounds which may be used for forming the vinyl polymer segments on the poly(alkylene monosulfide) backbones are those compounds which contain a terminal ethylenically unsaturated grouping. They may be monoolefins or polyolefins, and in the case of polyolefins they may be conjugated or unconjugated. These vinyl compounds may be used singly or in combination as desired. Examples of the numerous vinyl monomer materials which may be used in accordance with the present invention are: styrene; ethyl acrylate; methyl acrylate; vinyl acetate; acrylonitrile; methyl methacrylate; α-methyl styrene; vinyl isobutyl ether; isoprenebutadiene; ethylene; propylene; vinyl chloride; vinylidene chloride; vinyl fluoride; vinylidene fluoride; chlorotrifluoroethylene; tetrafluoroethylene; perfluoropropylene; p-methoxy-α-methyl styrene; p-methyl styrene; 2,4-dimethyl styrene; m-ethyl styrene; m-isopropenyl styrene; piperylene; ethyl-, propyl-, isopropyl-, butyl-, isobutyl-, sec-butyl-, tert-butyl-, amyl-, 2-ethylhexyl-, oxtyl-, capryl-, nonyl-, 3,5,5-trimethylhexyl-, dodecyl-, hexadecyl-, octadecyl-, cyclohexyl-, methylcyclohexyl-, trimethylcyclohexyl-, phenyl-, methyllyl-, crotyl-, butenyl-, undecenyl-, oleyl-, methoxyethyl-, ethylthioethyl-, butoxyethyl-, ethoxybutyl-, terphenyl-, phenylethyl-, hexahydrobenzyl-, tetrahydrobenzyl-, tetrahydrofurfuryl-, dicyclopentyl- and dicyclopentenyl alkacrylates and acrylates; 2-,3-, or 4- vinylpyridine; acrylonitrile; methacrylonitrile; dimethyl and diethyl methylene-malonate; vinylidene cyanide and methyl, ethyl or butyl α-cyanoacrylates. Generally these monomers should not have groups having an active hydrogen according to the Zerewitinoff test (described in two articles by Zerewitinoff: Ber. 40; 2023, 1907 and Ber. 41, 2233, 1908) such as hydroxyl carboxyl, thiol, imino, primary or secondary amino, and amido groups.

Suitable ionizing radiation for use in preparing the graft interpolymers of this invention include both radiation in the form sometimes regarded as particle radiation and radiation in the form sometimes regarded as ionizing electro-magnetic radiation.

By particle radiation is meant a stream of particles such as electrons, protons, neutrons, alpha-particles, deuterons, beta-particles, or the like, so directed that the said particles impinge upon the organic polymer substrate. The charged particles may be accelerated by means of a suitable voltage gradient, using such devices as a cathode-ray tube, resonant cavity accelerator, a Van de Graaff accelerator, a Cockcroft-Walton accelerator, or the like, as is well known to those skilled in the art. Neutron radiation may be produced by suitable nuclear reactions, e.g., bombardment of a beryllium target with deuterons or alpha-particles. In addition, particle radiation suitable for carrying out the process of this invention may be obtained from an atomic pile or from radioactive isotopes or from other natural or artificial radioactive materials.

By ionizing electromagnetic radiation is meant radiation of the type produced when a metal target (e.g., gold or tungsten) is bombarded by electrons possessing appropriate energy. Such radiation is conventionally termed X-ray. In addition to X-rays produced as indicated above, protons of ionizing electromagnetic radiation suitable for carrying out the process of the invention may be obtained from a nuclear reactor ("pile") or from natural or artificial radioactive material. In all of these latter cases the radiation is conventionally termed gamma rays.

It is recognized that the energy characteristics of one form of ionizing radiation can be expressed in terms which are appropriate for another form. Thus, one may express the energy of either the particles of radiation commonly considered as particle radiation or of the photons of radiation commonly considered as wave or electromagnetic radiation in electron volts (ev.) or million electron volts (mev.). In the irradiation process of this invention, radiation consisting of particles or photons having an energy of 100 ev. and over may be employed and particles or photons having an energy of 0.001 mev. and over are preferred. With radiation of this type, the graft copolymers of this invention can be obtained with a minimum length of exposure to the radiation, permitting maximum efficiency in utilization of the radiation. Particles or photons with an energy equivalent up to 4 mev. are the most useful from a practical standpoint, although radiation with energies of 10 mev. and higher may be employed.

Using a minimum radiation dosage of at least 1000 rads is necessary since lower dosages do not give useful amounts of grafting. Dosages as high as $10^8$ to $10^9$ rads and over may be employed, although dosages in excess of $10^{10}$ rads are generally to be avoided since they tend to degrade the polymer substrate. Maximum modification is generally obtained at 10–20M rads, and 0.1–1M rads frequently give useful degrees of modification. The exposure may be carried out in one slow pass or in several faster ones and may be conducted at any convenient rate of energy input. One rad is the quantity of radiation which will result in an absorption of 100 ergs per gram of irradiated material.

The process of this invention may be carried out over a wide range of temperatures. There is no known lower temperature limit and the only upper temperature limit is the decomposition temperature of the reactants or products, whichever is lower. In general, temperature of from about −90 to about 200° C. are preferred with a range of about 20° C. to about 100° C. being particularly preferred. These temperature considerations apply to the irradiating step and also to the contacting step when that is subsequent to the irradiating step.

In a preferred embodiment when the contacting step is conducted subsequent to the irradiating step, the irradiation is performed in a temperature range of −90 to +50° C. and the contacting step is subsequently performed in a temperature range of 0 to 100° C. over a period of 10–60 minutes under reduced pressure and in the absence of air. Pressure is not a critical feature of this invention. The process is generally carried out under reduced pressure in the absence of air; however, it may be desirable in certain cases to conduct the polymerization at atmospheric pressure or even under pressure. In certain cases it may also be desirable to conduct the process under an inert atmosphere.

The process of this invention is preferably carried out in the absence of any added reaction medium. However, it may also be carried out in the presence of inert liquids, such as water, benzene, hexane, carbon disulfide, diethyl ether, dimethoxyethane, tetrahydrofuran and dioxane. The use of a liquid medium is particularly adaptable to the variation of the process in which the poly(alkylene monosulfide) is first irradiated and then subsequently contacted with the vinyl monomer.

To achieve graft polymers having the aforementioned desirable properties, the concentration of vinyl monomer with respect to the monosulfide monomer content in the poly(alkylene monosulfide) may be varied from about 2 to about 85 mol percent with a preferable monomer concentration of from about 5 to about 30 mol percent. A reaction whereby the monomer is utilized in excess of 50 mol percent with respect to the monosulfide monomer content of the poly(alkylene monosulfide) produces a graft polymer having characteristics which assume those of the branch material rather than that of the composite graft polymer.

The following examples are merely illustrative of the practice of this invention and are not to be construed as being a limitation thereof.

EXAMPLE 1

Graft interpolymer of styrene on poly(ethylene sulfide)

A clean, dry 30-ounce glass container was charged with 100 ml. benzene, 0.15 ml. of deoxydized water, and 2.0 ml. of a solution of diethyl zinc and benzene (0.00521 mol/ml.) and the mixture was agitated under a nitrogen atmosphere for four to ten minutes. 50 ml. of ethylene sulfide freshly distilled from calcium hydride was then added to the mixture in the container, and the container was flushed with nitrogen. Thereafter the container was capped with aluminum foil and allowed to stand at room temperature overnight. A solid white product was formed from which solvent was removed by heating the product under a vacuum at 60° C. The resulting dried white, powdery, poly(ethylene sulfide) had a melting point of 203° C.–205° C. The yield was 24.7 grams (49.3% of theory).

A Pyrex polymerization tube containing 50.9 grams of styrene was further charged with 8.0 grams of the poly(ethylene sulfide) produced above. The tube was cooled to −78° C. with Dry Ice; then evacuated and sealed. The tube and contents were then exposed to gamma radiation from a cobalt-60 source at 21° C. The total amount of radiation was $1.17 \times 10^6$ rads. The tube was then opened, the contents removed and extracted with methanol to remove any unreacted vinyl monomer present. The polymeric portion was further washed with petroleum ether and dried under reduced pressure. The product, weighing 13.6 g., was then extracted with refluxing benzene. The insoluble residue, comprising 80% of the material extracted, had a melting point of 200° C. and the following analysis: carbon 54.16%, hydrogen 7.06%, and sulfur 38.9 to 39.2%. Based on the above analysis, the graft interpolymer contained about 27% of styrene by weight (17.6 mol percent).

A physical mixture of styrene homopolymer and poly(ethylene sulfide) homopolymer when extracted with benzene was separtaed quantitatively, thus showing that the graft polymer powdered above to be a true graft interpolymer.

The resultant graft interpolymer of styrene and poly(ethylene sulfide) was molded into various forms.

EXAMPLE 2

Graft interpolymer of ethyl acrylate on poly(ethylene sulfide)

A Pyrex polymerization tube containing 8.0 grams of ethylene sulfide homopolymer prepared as in Example 1 was further charged with 44.7 grams of ethyl acrylate. The mixture was cooled in Dry Ice, then evacuated and sealed. The tube and contents were then irradiated with gamma radiation from a cobalt-60 source as in Example 1. The tube was then opened, the contents removed and washed with methanol to remove any unreacted vinyl monomer. The residue was then further washed with petroleum ether and dried under reduced pressure. The yield was 50.8 grams of a white rubbery product which was extracted with boiling acetone and found to be 16% soluble. Subsequent extraction with boiling methyl ethyl ketone caused extensive swelling but no further weight loss. This residue was a moldable graft interpolymer of ethyl acrylate on poly(ethylene sulfide) and found to have an analysis of 54.08% carbon, 7.74% hydrogen and 12.59% sulfur which analysis showed the graft interpolymer to be comprised of about 76% ethyl acrylate by weight (65.5 mol percent).

EXAMPLE 3

Graft interpolymer of vinyl acetate on poly(ethylene sulfide)

A Pyrex polymerization tube containing 7.6 grams of ethylene sulfide homopolymer produced as in Example 1 and 61.8 grams of vinyl acetate was irradiated as in Example 1. 18.8 grams of crude produce was recovered of which 54% was acetone extractable. The insoluble residue melted at about 200° C. and had the following analysis: carbon 47.72%, hydrogen 7.05%, sulfur 23.4 to 23.8%. This analysis showed the moldable graft interpolymer of vinyl acetate on poly(ethylene sulfide) to contain about 56% vinyl acetate by weight (47.1 mol percent).

EXAMPLE 4

Graft interpolymer of acrylonitrile of poly(ethylene sulfide)

A Pyrex polymerization tube was charged with 8.2 grams of ethylene sulfide homopolymer produced as in Example 1 and 44.0 grams of acrylonitrile. The tube was evacuated, sealed and irradiated with gamma radiation as in Example 1. After extracting the resulting polymeric contents with methanol to remove any unreacted vinyl monomer, the residue was washed with petroleum ether and dried under reduced pressure. The yield was 51.9 grams of a yellowish white, hard resin which when heated above 200° C. turned brown but did not melt. An extraction with boiling dimethylformamide resulted in dissolution of 33% by weight of the material in the solvent. The insoluble fraction had a nitrogen analysis of 21.1% which indicated an acrylonitrile content of about 80% by weight (83.7 mol percent); the remainder constitutes the ethylene sulfide homopolymer backbone. Under similar extraction conditions a physical mixture of poly(ethylene sulfide) and poly(acrylonitrile) was quantitatively separated. It was therefore concluded that the resultant polymer was a true graft interpolymer of acrylonitrile on poly(ethylene sulfide). The graft interpolymer is formed into an article of manufacture.

EXAMPLE 5

Graft interpolymer of methyl methacrylate on poly(ethylene sulfide)

A Pyrex polymerization tube was charged with 8.3 grams of ethylene sulfide homopolymer prepared as in Example 1 and 42.4 grams of methyl methacrylate. After evacuating and sealing, the tube was irradiated as in Example 1. After extracting the resulting polymeric reaction product with methanol to remove any unreacted vinyl monomer, the residue was washed with petroleum ether and dried under reduced pressure. The result was 49.4 grams of a hard white resin having a melting point of between 220 and 240° C. An acetone extraction showed a 37% by weight solubility. The insoluble residue had the following analysis: carbon 52.29%, hydrogen 7.80%, sulfur 17.4 to 17.9% which analysis indicated a graft interpolymer containing 67% methyl methacrylate by weight (55 mol percent). This insoluble residue had a melting point of about 205 to 220° C. and was demonstrated to be a moldable graft interpolymer of methyl methacrylate on poly(ethylene sulfide) since a physical blend of the two homopolymers was quantitatively separated by acetone extraction.

EXAMPLE 6

Graft interpolymer of styrene on poly(propylene sulfide)

A propylene sulfide homopolymer was prepared by charging a reaction bottle flushed with nitrogen with 50 ml. of propylene sulfide 150 ml. of benzene 1.76 ml. of a 55.8% solution of diethyl zinc in benzene and 0.14 grams of oxygen free water. The diethyl dinc/water charge gave a catalyst system having approximately a 1:1 mol ratio of diethyl zinc to water. Within 5 minutes the polymerization reaction began and within 15 min. the heat of the exothermic reaction had raised the temperature of the system to approximately 50° C. A clear slightly orange colored solution began to form at this time. The bottle and contents were then tumbled in a 63° C. tumbling bath for 4 hours. At the end of this time the bottle and contents were removed from the tumbling bath and cooled to room temperature. The product was removed from the bottle and the solvent was evaporated therefrom first in a current of air and then in a vacuum oven at about 1 mm. Hg and 40° C. for 24 hours. Quantitative yields of a nontacky, slightly orange colored elastomer which was a substantially insoluble homopolymer of propylene sulfide in benzene were recovered.

A Pyrex polymerization tube containing 33.2 grams of the above prepared propylene sulfide homopolymer was further charged with 60.9 grams of styrene. The reaction tube was evacuated and sealed. Irradiation with gamma radiation as in Example 1 and subsequent extraction with methanol to remove any unreacted vinyl monomeric constituents, washing with petroleum ether and drying under reduced pressure resulted in a yield of 33.4 grams of polymeric product. After extracting with boiling cyclohexane there remained about 96% by weight of an insoluble residue. An anlysis of this residue showed the following analysis: carbon 52.39%, hydrogen 8.30% and sulfur 38.90%. This analysis demonstrated a graft interpolymer of styrene on poly(propylene sulfide) comprising approximately 8 to 10% of styrene by weight (or about 6.5 mol percent).

EXAMPLE 7

Graft interpolymer of acrylonitrile on poly(propylene sulfide)

A Pyrex polymerization tube was charged with 40.0 grams of propylene sulfide homopolymer prepared as in Example 6 and 59.8 grams of acrylonitrile. The tube was evacuated, sealed and irradiated as in Example 1. The polymeric product formed was extracted with methanol to remove any unreacted vinyl monomer present, washed with petroleum ether and dried under reduced pressure. The yield was 92.0 grams of a conglomerate of tough beads embedded in a solid continuous matrix of homopolyacrylonitrile. After a mechanical separation of the beads from the matrix, the beads were extracted with refluxing benzene and the residue analyzed to show a nitrogen content of 14.4 to 14.9%, and a sulfur content of 17.0 to 17.8% which indicated that the above was a graft interpolymer comprising 56 to 60% of acrylonitrile by weight (64 to 67.3 mol percent).

EXAMPLE 8

Graft interpolymer of styrene on a copolymer of ethylene sulfide and propylene sulfide A catalyst solution was prepared by charging a small reaction bottle flushed with nitrogen, with 100 ml. of benzene, 0.20 ml. of oxygen-free water and 2.02 ml. of a 0.00549 mol per ml. solution of diethyl zinc in benzene. This solution was allowed to stand at room temperature under a nitrogen atmosphere until a yellow color developed. A second reaction bottle was charged with 125.5 ml. of freshly distilled ethylene sulfide, 95.5 ml. of propylene sulfide, 200 ml. of benzene and 10 ml. of the above catalyst solution. The bottle was flushed with nitrogen, capped and reacted at 80° C. for 1 hour. The resultant copolymer was dried at 50° C. at 1 mm. pressure for 24 hours to yield 368.7 grams of white solid material. It was analyzed to contain 47.93% of sulfur, indicating an ethylene sulfide content of 46.2% by weight (51.5 mol percent).

A Pyrex polymerization tube was then charged with 52.9 grams of the above prepared copolymer and 39.2 grams of styrene. The tube was then evacuated and sealed. Subsequent irradiation with gamma radiation as in Example 1, extracting with methanol to remove any unreacted vinyl monomeric constituents, rinsing with petroleum ether and drying under reduced pressure, yielded 68.6 grams of polymeric product. The analysis of this product was carbon 54.71%, hydrogen 7.50% and sulfur 38.9 to 39.1%. After extracting with boiling benzene the insoluble residue was shown to contain 32.1% sulfur which indicated that such residue was a graft interpolymer of styrene on a propylene sulfide/ethylene sulfide copolymer backbone which graft interpolymer comprised 33% styrene by weight (24 mol percent). The graft interpolymer is formed into a fiber.

EXAMPLE 9

Graft interpolymer of chlorotrifluoroethylene on poly(ethylene sulfide)

A Pyrex polymerization tube containing 13.7 grams of chlorotrifluoroethylene was further charged with 3.1 grams of poly(ethylene sulfide) prepared as in Example 1 and 65.2 grams of carbontetrachloride. The tube was cooled to −78° C., evacuated, sealed and irradiated as in Example 1. The tube was opened and the contents removed and filtered to yield 7.2 grams of product which was extracted with refluxing dimethyl formamide. The soluble portion, which amounted to 21% by weight of original product, was poly(chlorotrifluoroethylene), the remainder was a graft interpolymer of poly(chlorotrifluoroethylene) on poly(ethylene sulfide). The graft interpolymer comprised 56% ethylene sulfide by weight (73 mol percent). The melting point of the graft polymer was 197° C.

I claim:
1. A graft interpolymer comprising at least one vinyl monomer containing a terminal ethylenically unsaturated grouping attached at intervals to a poly(alkylene monosulfide) backbone, the concentration of vinyl monomer with respect to the monosulfide monomer contained in the poly(alkylene monosulfide) in the ratio of from about 2 to about 85 mol percent.
2. An interpolymer as in claim 1 wherein said poly(alkylene monosulfide) backbone is an alkylene episulfide polymer.
3. An interpolymer as in claim 2 wherein said alkylene episulfide polymer is vicinal episulfide polymer.
4. An interpolymer as in claim 3 wherein said vicinal episulfide polymer is an ethylene sulfide polymer.
5. An interpolymer as in claim 4 where said ethylene sulfide polymer is a homopolymer.
6. An interpolymer as in claim 4 wherein said vicinal episulfide polymer is a propylene sulfide homopolymer.
7. An interpolymer as in claim 1 where said poly(alkylene monosulfide) backbone is an interpolymer.
8. An interpolymer as in claim 7 wherein said interpolymer comprises an ethylene sulfide-propylene sulfide copolymer.
9. An interpolymer as in claim 1 wherein said vinyl monomer is styrene, ethyl acrylate, vinyl acetate, acrylonitrile, methyl methacrylate, chlorotrifluoroethylene, butadiene, isoprene, vinyl chloride, vinylidene chloride, or tetrafluoroethylene.
10. An interpolymer as in claim 9 wherein said vinyl monomer is styrene.
11. An interpolymer as in claim 10 wherein said vinyl monomer is vinyl acetate.
12. An interpolymer as in claim 10 wherein said vinyl monomer is acrylonitrile.
13. An interpolymer as in claim 10 wherein said vinyl monomer is chlorotrifluoroethylene.
14. A process for the preparation of a graft interpolymer which comprises:
 (i) irradiating a poly(alkylene monosulfide) at a temperature below the decomposition temperature of the poly(alkylene monosulfide), and
 (ii) contacting the irradiated poly(alkylene monosulfide) with at least one vinyl monomer containing a terminal ethylenically unsaturated grouping in order to enable said grouping to attach to the poly(alkylene monosulfide), the concentration of the vinyl monomer with respect to the monosulfide monomer content in the poly(alkylene monosulfide) being in the ratio of from about 2 to about 85 mol percent.

15. A process for the preparation of a graft interpolymer which comprises:
  (i) contacting at least one vinyl monomer containing a terminal ethylenically unsaturated grouping with a poly(alkylene monosulfide), the concentration of the vinyl monomer with respect to the monosulfide monomers contained in the poly(alkylene monosulfide) being in the ratio of from about 2 to about 85 mol percent, and
  (ii) irradiating said poly(alkylene monosulfide) and vinyl monomer at a temperature below the decomposition temperature of the poly(alkylene monosulfide).

16. A process as in claim 14 wherein said poly(alkylene monosulfide) is activated by irradiation with at least 1000 rads of high energy ionizing irradiation having a minimum energy of at least 100 ev.

17. A process as in claim 16 wherein the high energy ionizing radiation is electromagnetic radiation.

18. A process as in claim 17 wherein the high energy radiation is gamma radiation.

19. A process as in claim 18 wherein said gamma radiation is supplied by a cobalt —60 source.

20. A process as claim 14 wherein said poly(alkylene monosulfide) is a vicinal episulfide polymer.

21. A process as in claim 20 wherein said vincinal episulfide polymer is ethylene sulfide polymer.

22. A process as in claim 21 wherein said vinyl monomer is selected from the group consisting of styrene, ethyl acrylate, vinyl acetate, acrylonitrile, methyl methacrylate, and chlorotrifluoroethylene.

23. A process as in claim 21 wherein said vinyl monomer is styrene.

24. A process as in claim 21 wherein said vinyl monomer is acrylonitrile.

25. A process as in claim 21 wherein said vicinal episulfide polymer is propylene sulfide polymer.

26. A process as in claim 14 which is conducted under autogenous pressures, under an inert atmosphere, and at a temperature from about —90 to about 200° C.

References Cited

UNITED STATES PATENTS

| | | | |
|---|---|---|---|
| 2,991,269 | 7/1961 | Nozaki | 204—159.15 |
| 3,225,120 | 12/1965 | Baker | 260—874 |
| 3,252,880 | 5/1966 | Magat et al. | 204—159.15 |
| 3,290,413 | 12/1966 | Fettes | 260—874 |

MURRAY TILLMAN, *Primary Examiner.*

JOHN T. GOOLKASIAN, *Assistant Examiner.*

U.S. Cl. X.R.

204—159.2; 260—874, 887, 898, 899, 900, 901